US012512290B2

(12) United States Patent
Radcliffe et al.

(10) Patent No.: US 12,512,290 B2
(45) Date of Patent: Dec. 30, 2025

(54) X-RAY TUBE WITH FLEXIBLE INTENSITY ADJUSTMENT

(71) Applicant: incoatec GmbH, Geesthacht (DE)

(72) Inventors: Paul Radcliffe, Hamburg (DE); Christian Hoffmann, Guelzow (DE); Kaan Atak, Hamburg (DE); Carsten Michaelsen, Artlenburg (DE)

(73) Assignee: incoatec GmbH, Geesthacht (DE)

( * ) Notice: Subject to any disclaimer, the term of this patent is extended or adjusted under 35 U.S.C. 154(b) by 243 days.

(21) Appl. No.: 18/447,503

(22) Filed: Aug. 10, 2023

(65) Prior Publication Data

US 2024/0062985 A1 Feb. 22, 2024

(51) Int. Cl.
*H01J 35/14* (2006.01)

(52) U.S. Cl.
CPC .................................. *H01J 35/147* (2019.05)

(58) Field of Classification Search
CPC .......... H01J 35/04; H01J 35/14; H01J 35/064; H01J 35/12; H01J 35/147; H05G 1/085; H05G 1/46
See application file for complete search history.

(56) References Cited

U.S. PATENT DOCUMENTS 4,730,353 A 3/1988 Ono et al.
6,249,566 B1 6/2001 Hayashi et al.
6,282,263 B1 8/2001 Arndt et al.
6,778,633 B1 8/2004 Loxley et al.
8,588,372 B2 * 11/2013 Zou ....................... H01J 35/065 378/138
9,020,101 B2 4/2015 Omote et al.
9,728,369 B2 8/2017 Hans
2017/0154750 A1 6/2017 Sato

FOREIGN PATENT DOCUMENTS

DE 10 2014 208 729 A1 11/2015
DE 10 2014 209 389 B4 10/2019
JP 2005-038825 A 2/2005
JP 2006-164819 A 6/2006
WO WO-2013018027 A1 * 2/2013 ............. C23C 14/08

* cited by examiner

*Primary Examiner* — Jurie Yun
(74) *Attorney, Agent, or Firm* — Orbit IP, LLP; Marc G. Martino

(57) ABSTRACT

An x-ray tube includes a thermionic cathode generating an electron beam propagating from the cathode to a target along a beam axis. The x-ray tube has apertures in the form of a control electrode with a first aperture opening, a focusing electrode with a second aperture opening and a beam shaping electrode with a third aperture opening. The first aperture opening is smaller than the emission surface and has a contour rotationally symmetric with respect to the beam axis. The second aperture opening is larger than the first aperture opening and has a contour rotationally symmetric with respect to the beam axis. The third aperture opening has a contour which is aligned with an xy plane and non-rotationally symmetric with respect to the beam axis. The X-ray tube has a simple structure for generating an electron beam where the number of electrons can be varied easily over a wide range.

27 Claims, 6 Drawing Sheets

X-RAY TUBE WITH FLEXIBLE INTENSITY ADJUSTMENT

CROSS-REFERENCE TO RELATED APPLICATIONS

This application claims priority to European Patent Application EP 22 191 257.9, filed Aug. 19, 2022, the entire contents of which are hereby incorporated in full by this reference.

DESCRIPTION

Field of the Invention

The invention concerns an X-ray tube comprising: a thermionic cathode having a flat electron emission surface; a plurality of electrostatic electrodes; and a target; wherein the X-ray tube is designed for generating an electron beam propagating from the cathode to the target along a beam axis running along a z direction and for generating a microfocus spot on the target.

Background of the Invention

Such an X-ray tube is known from U.S. Pat. No. 6,282,263 B1.

X-rays are generally generated by X-ray tubes, wherein electrons are emitted at a cathode and accelerated towards an anode by a high voltage, and an electron beam is focused into a beam spot on a target.

Microfocus X-ray tubes, with spot sizes of the order of 100 μm or less, are often used in analytical devices with X-ray optics such as monochromators, curved monochromators, multilayer mirrors, or capillary lenses.

Generally, X-ray optics usually utilize a small solid angle, and hence, can transmit radiation from only a limited area of the focal spot on the target. If monochromatizing X-ray optics are used, they selectively exploit one characteristic energy line of the spectrum.

For the cathode of an X-ray tube, wound tungsten (W) filaments (and sometimes hairpin shaped tungsten filaments) are mainly used. Usually, the cathode is in a slit or behind a mask to define its active area and the electrons are extracted by the voltage applied between cathode and anode.

The trajectories of the electrons in an X-ray tube are basically perpendicular to the equipotential lines of the electric field in the X-ray tube. The internal components of the X-ray tube (e.g., shape of the anode, openings between filament and anode) are therefore designed in an appropriate way such that the equipotential lines act like a lens and e.g., produce a demagnified image of the filament on the target.

The desired tube power is typically set by controlling the temperature of the tungsten filament.

An X-ray generator, in which electrons are thermally emitted from a wound filament cathode and travel to a target anode is known from U.S. Pat. No. 9,020,101 B2. Here, a Wehnelt electrode is provided around the filament to control the traveling direction of the emitted electrons by a control voltage applied to the Wehnelt electrode.

Due to the geometric design of such wound filaments, the emission of electrons locally varies on the filament. The temperature and temperature distribution of a wound filament emitter and unavoidable manufacturing tolerances lead to variations in the focal spot sizes and shapes. Since these variations have a quadratic effect on the target surface loading, this could lead to quality/performance issues or premature failure. In general, electrons are extracted mainly from the filament tips. Since this pattern is projected in the focal spot, this creates inhomogeneous heat loading, which in turn reduces the practically achievable performance of an X-ray tube.

Additionally, X-ray tubes with low anode voltages, which are desirable for certain applications, can only be operated with limited power, otherwise the temperature of the filament would be too high.

An efficient use of X-rays generated in low-power X-ray generators is discussed in U.S. Pat. No. 6,249,566 B1, which discloses a composite monochromator disposed between a microfocus X-ray source and a sample. The composite monochromator is intended to focus X-rays particularly well for the application of low-power X-ray sources.

In order to achieve the highest possible performance of an application, an X-ray tube should produce a focal spot that is stable in shape and size. In practice, the focal spot dimensions are selected in such a way that, including the necessary reserves and safety factors, the specific heat loading of the target and therefore the intensity degradation per time is still tolerable, and the service lifetime is acceptable.

The penetration depth of the electrons into the target material, which depends on the acceleration voltage, the target surface roughness and thermal resilience, and other practical considerations mean that there is an ideal take-off angle of the target for the respective application and the respective target material. This, in turn, leads to a certain optimal length-to-width ratio of the thermal focal spot on the target for the respective application. In particular, the thermal focal spot is chosen such that the projection is circular under the selected take-off angle (optical focal spot).

Exceeding the optimal focal spot size means that the X-ray optics cannot use some of the photons generated. In turn, a smaller focal spot leads to a quadratic increase in the thermal surface stress and can shorten the service life of the target.

An X-ray generator with means for an adjustable focusing of an electron beam is disclosed in U.S. Pat. No. 6,282,263 B1. Here, the electrons that form the electron beam are emitted from a cathode and accelerated to an anode. The electrons pass through a hole in the anode and then through a long pipe to a target to produce the X-rays. An electrostatic Wehnelt electrode and magnetic lenses are used to focus the electron beam onto the target and to deform the electron beam so that it has an elongated cross-section. Instead of magnetic lenses, the use of electrostatic lenses is also mentioned. Furthermore, the use of a flat dispenser cathode is suggested, with the dispenser cathode having the advantage of a long lifetime.

From U.S. Pat. No. 6,778,633 B1 an X-ray generator is known in which an electron beam is focused through lenses onto a target to produce X-rays. A stigmator in the form of a quadrupole magnet is used to deform the cross-section of the electron beam from a circular cross-section to an elongated cross-section. Control means for controlling the lenses include a switching means. The switching means allows the lenses to be switched from a state in which the electron beam is sharply focused to a state in which the electron beam is less focused. This reduces the load of the target by the electron beam when the X-rays are not in use.

The X-ray devices disclosed in the prior art have a comparatively complex structure for directing and deforming the respective electron beam. Furthermore, the current density of the electron beams in the devices disclosed in the prior art is influenced to a comparatively large extent by the potential at the respective anode which attracts the electrons. This makes it difficult to flexibly change the current density of the electron beam (and thus the intensity of the X-ray radiation produced by the electron beam).

SUMMARY OF THE INVENTION

Objective of the Invention

It is an object of the invention to provide an X-ray tube having a simple structure for generating an electron beam and focusing it on the target, wherein the number of electrons in the electron beam can be varied easily and over a wide range.

Description of the Invention

This problem is solved by an X-ray tube according to claim 1. The features of advantageous embodiments are given in the dependent claims.

The X-ray tube according to the invention is characterized in that the target is configured as a target anode, and that the X-ray tube comprises the following elements: a control electrode, located in z direction in front of the flat electron emission surface, and configured as an aperture with a first aperture opening smaller than the emission surface, the first aperture opening having a contour which is rotationally symmetric with respect to the beam axis; a focusing electrode, located in z direction in front of the control electrode, and configured as an aperture with a second aperture opening larger than the first aperture opening, the second aperture opening having a contour which is rotationally symmetric with respect to the beam axis; a beam shaping electrode, located in z direction in front of the focusing electrode and before the target anode, and configured as an aperture with a third aperture opening, the third aperture opening having a contour which is aligned with an xy plane and non-rotationally symmetric with respect to the beam axis, with x, y, z forming a Cartesian coordinate system.

Electrons are emitted from the cathode, wherein a fraction of the electrons passes through the control electrode, the focusing electrode, and the beam shaping electrode and is directed towards, and typically focused on the target anode to produce X-rays.

Advantageously, the X-ray tube according to the invention is simpler, smaller and less expensive than previous arrangements of X-ray tubes with adjustable focal spots. In particular, no external magnetic lenses are required. Instead, electrostatic apertures with a comparatively simple structure are used to guide the electrons from the cathode to the target anode.

The control electrode and the focusing electrode are arranged closer to the cathode than the target anode and have the shape of a pinhole. Advantageously, due to the shape and arrangement of the control electrode and the focusing electrode, these electrodes have the main influence on the number of electrons that are accelerated along the beam axis towards the target anode after emission from the cathode. Thus, electric potentials at these two electrodes, and above all the potential at the control electrode, determine to a large extent the current density of the electron beam formed by the electron's incident on the target anode for generating X-rays. In particular, the available number of electrons for generating X-rays is largely independent of the difference of the potential at the cathode and the target anode. Therefore, the current density of the electron beam can be changed without adjusting the voltage between the target anode and the cathode. Furthermore, the current density of the electron beam can be altered without changing the temperature of the cathode. As a result, the current density of the electron beam can be varied quickly without having to adjust other major parameters relevant for producing or shaping the X-rays (for example, the electric power used to operate the cathode or to provide the acceleration voltage). In particular, a high current density of the electron beam can be generated with comparatively low voltages between the cathode and the target anode, as required for some applications.

This also means that by varying the potentials at the control electrode and at the focusing electrode, the number of electrons in the electron beam can be increased comparatively quickly while maintaining a constant potential difference between the cathode and the target anode. For example, the number of electrons in the electron beam can be changed more quickly than in the case of changing the temperature in a thermionic emitter to affect the number of electrons emitted, and possible thermal limits of the thermionic emitter can be obeyed too easily. More electrons can be extracted from the cathode as compared to the cathode being only heated without using the adjacent control electrode and focusing electrode. Furthermore, the number of electrons can be varied while maintaining in a simple way a better focused electron beam than in the case of reducing the potential difference between a Wehnelt electrode and its associated cathode, in which case the focusing of the electron beam is generally degraded.

The rotationally symmetrical shape of the aperture opening of the control electrode simplifies the manufacture of the control electrode, especially for comparatively small openings of the control electrode. In addition, the rotational symmetry of the aperture opening of the control electrode and the focusing electrode around the beam axis causes a symmetrical distribution of the electrons, which are accelerated in the direction of the target anode in order to produce a symmetrical electron beam around the beam axis.

The non-rotationally symmetric shape of the third aperture opening of the beam shaping electrode can be used to easily cause the cross-section of the electron beam to be deformed from a rotationally symmetric cross-section to a non-rotationally symmetric cross-section before the electron beam hits the target anode. This means that due to the non-rotationally symmetric shape of the aperture opening of the beam shaping electrode, the beam shaping electrode can be used as a stigmator. Even if the target surface of the target anode is basically perpendicular to the electron beam axis (e.g., with a deviation 25° or a deviation 10° or a deviation 5°), the focal spot on the target anode also has a non-rotationally symmetric shape (e.g., a line shape). Note that the effective shape of the focal spot on the target surface can also be stretched by an inclination angle of the target surface with respect to the electron beam axis deviating from 90°. Advantageously, the thermal load on the target anode can generally be reduced by a non-rotationally symmetric shape of the focal spot. Note that the invention also allows to change the degree of asymmetry (aspect ratio) by adjusting, in particular, the potential at the beam shaping electrode, if need may be. With a relatively large aperture opening of the beam shaping electrode, this aperture opening can be produced comparatively easily and accurately with complex shapes, in particular, ellipsoidal shapes.

The flat design of the cathode results in a more uniform density distribution of electrons as they exit the cathode. The performance issues mentioned above related to cathodes in the form of wound filaments can be avoided by the flat emitter. The use of a flat emitter and the shielding of the extracted electron beam by the comparatively small aperture opening of the control electrode produce a very homogeneous distribution of the current density in the electron beam. The resulting absence of critical sections in the focal spot (due to an inhomogeneous electron distribution in the electron beam that may result e.g., from winding tips) allows operation of the X-ray tube comparatively close to the physical limit of the target anode.

The design and arrangement of the electrodes also allows to change the size of the focal spot during operation of the X-ray tube by varying the potentials at the electrodes (in particular, at the control electrode and, above all, at the focusing electrode). This can be useful to compensate for manufacturing tolerances and to allow for different operating modes of the X-ray tube, e.g., standby operation and active operation.

A further advantage of the design of the X-ray tube according to the invention lies in the fact that the evaporation of cathode material, in particular, tungsten, can be diminished or avoided during operation, which in some cases is unwanted for applications.

Advantageously, with certain target materials such as molybdenum (Mo), an increase in power density of almost a hundred percent is possible compared to conventional X-ray tubes using a tungsten wound filament without reducing the service life of the target anode.

The X-ray tube preferably comprises an X-ray window made of a material of low X-ray absorption, such as beryllium. The X-ray tube typically generates an X-ray cone of 20° or less.

The flat emission surface is generally perpendicular to the electron beam axis and centered with respect to the beam axis. Typically, the target anode has a flat target surface. The target surface of the target anode is usually perpendicular or somewhat inclined with respect to the electron beam direction. The generated x-ray beam typically is taken with respect to the target surface of the target anode under a take-off angle TOA of $3° \leq TOA \leq 25°$.

Typically, the control electrode and the focusing electrode are made from a refractory metal with a melting point above 1850° C., the metal typically being selected from the group Nb, Mo, W, Ta, Re, Ti, Os, Ru, Rh, Ir, V, Cr, Hf, Zr, Mn. Further, typically the target anode comprises at least a target layer of a target material selected from the group Cu, Mo, Ag, Co, Cr, W, Rh, Ti, Fe, Al. Preferably, the X-ray tube is of metal-ceramic type.

PREFERRED EMBODIMENTS OF THE INVENTION

According to an advantageous embodiment of the X-ray tube, the third aperture opening is of an elliptical shape, and the third aperture opening has a major axis aligned with the y direction. The elliptical design of the third aperture opening advantageously allows the electron beam to be deformed in a simple manner when passing through the third aperture opening in such a way that the electron beam also has an elliptical cross-section. The deformed electron beam impinges on the target anode and in general generates a focal spot which also has an elliptical shape. In projection, then a circular beam spot can be obtained, and an X-ray beam of circular cross-section can be obtained in the X-ray beam direction. The elliptical focal spot reduces the thermal load on the target anode. In particular, the smallest distance between the center and the edge of an elliptical, elongated focal spot is smaller than in the case of a circular focal spot of the same total area. On average, the smallest distance between interior area sections and the nearest edge is smaller in the elliptically elongated focal spot than in a circular focal spot of the same total area. This allows the heat generated by the electron beam in the target anode to dissipate more quickly over the edge of the focal spot into regions of the target anode outside the focal spot.

In a variant of the aforementioned embodiment, the target anode has a flat target surface, wherein the flat target surface is inclined with respect to the y direction, inclined with respect to the z direction, and is parallel to the x direction. The flat surface of the target anode results in a more homogeneous distribution of the X-rays emitted from the target anode than in the case of a target anode with a non-flat surface. This makes it easier to focus the X-rays on a target object. The above-described inclination angle of the surface of the target anode enlarges the asymmetry (aspect ratio) of the electron beam (caused by the beam shaping electrode) in the resulting focal spot on the target anode. Accordingly, the heat load of the target anode is further reduced. Further, if desired, taking the X-ray beam perpendicular to the electron beam may be achieved.

A variant of the aforementioned embodiments of the X-ray tube is characterized in that the beam shaping electrode is adapted to shape the electron beam into a line focus on the target anode target with an aspect ratio in x:y smaller than 1:5, preferably smaller than 1:10, more preferably smaller than 1:20. The smaller the aspect ratio, the more pronounced the longitudinal expansion of the actual elliptical shape of the focal spot. This means that when the target anode is irradiated with the electron beam, heat can be dissipated particularly quickly from the interior, in particular, the center of the focal spot to the edges of the focal spot. The heat load on the target anode is significantly reduced. Note that preferably, an aspect ratio in x, y of the electron beam cross-section in a plane perpendicular to the electron beam axis is also smaller than 1:5 or 1:10 or 1:20.

A preferred embodiment of the X-ray tube is characterized in that the X-ray tube comprises a control connection for independently applying a control voltage to the control electrode, and a focusing connection for independently applying a focusing voltage to the focusing electrode. Via the control connection, the electron beam density can be adjusted, and with the focusing connection, the focusing of the electron beam can be adjusted, both in a simple and independent way. The electron beam widens on its way from the control electrode with the smaller aperture to the focusing electrode with the larger aperture. The potential at the focusing electrode can be changed independently of the potential at the control electrode to flexibly adjust the beam divergence of the electron beam.

In an advantageous embodiment, the thermionic cathode and the beam shaping electrode are electrically connected. Accordingly, the emission cathode (or at least a part of it) and the beam shaping electrode are in use on the same electrical potential (irrespective of a possible heating current at the emission cathode). This setup is particularly simple. Further, in a simple way, the potential of the beam shaping electrode is negative with respect to the potential of the target anode (note that an acceleration voltage is set between the cathode and the target anode for the electrons). Advantageously, the electron beam can be focused toward the target anode. Preferably, the cathode and the beam shaping electrode are grounded.

In an alternative embodiment of the X-ray tube, the X-ray tube comprises a beam shaping connection for independently applying a beam shaping voltage to the beam shaping electrode. In this embodiment, the widening of the electron beam between the focusing electrode and the beam shaping electrode and the curvature of the electron beam between the beam shaping electrode and the target anode can be adjusted with comparatively great flexibility. If desired, via the beam shaping electrode, the size and shape of the focal spot on the target anode can be influenced.

A further embodiment of the X-ray tube is characterized in that the control electrode is adapted to mask a portion P of the electron beam originating from the thermionic cathode, with P≥50%, preferably P≥75%. In general, this leads to a better alignment of the passing electrons along the electron beam axis, and an improved homogeneity of the focal spot illumination. The electrons pass through the opening of the control electrode in the direction of the target anode. Masking of a large portion of the electrons emitted from the cathode is preferably effected by a comparatively small diameter of the opening of the control electrode. Advantageously, only electrons that are relatively close to the beam axis of the electron beam after exiting the cathode pass through the aperture opening of the control electrode. This ensures that only electrons used to produce a focal spot on the target anode flow through the control electrode. Stresses on the X-ray tube, in particular, thermal stresses, due to stray electrons or blurred focusing of the electron beam on the target anode are thus avoided. The size and shape of the focal spot is highly independent of the dimensions of the emission surface. Instead, the aperture opening of the control electrode affects the focal spot.

A preferred variant of the X-ray tube is characterized in that for a first distance DIST1 of the control electrode from the emission surface and a second distance DIST2 of the focusing electrode from the control electrode, the following applies: DIST2≥1.5*DIST1; preferably DIST2≥2*DIST1; in particular, wherein 100 μm≤DIST1≤400 μm and/or 200 μm≤DIST2≤1000 μm. With such dimensions, the focusing of the electron beam can be efficiently altered, in particular, via the potential at the focusing electrode. Comparatively large distances between the control electrode and the focusing electrode result in the electron beam being significantly widened between the control electrode and the focusing electrode, even with small diameters of the control electrode and with low divergence of the electron beam. As a result, the ratios of the diameters of the openings of the control electrode and the focusing electrode as well as the potentials applied to these electrodes can be selected more flexibly.

An advantageous embodiment of the X-ray tube is characterized in that for a first diameter DIA1 of the first aperture opening of the control electrode and a second diameter DIA2 of the second aperture of the focusing electrode, the following applies: DIA2≥3*DIA1; preferably DIA2≥10*DIA1; in particular, wherein 0.2 mm≤DIA1≤1.0 mm and/or 0.6 mm≤DIA2≤3.0 mm. In this embodiment, the ratio of the diameters of the apertures of the control electrode and the focusing electrode are chosen to be sufficiently large such that even if the divergence of the electron beam between the control electrode and the focusing electrode is comparatively large, no or only few further electrons are removed from the electron beam at the focusing electrode, to avoid attenuation of the intensity of the electron beam. The aperture opening of the focusing electrode is in general chosen in such a way that the electron beam is deflected but not clipped. On the other hand, a comparatively small aperture opening of the control electrode can advantageously contribute to a precise alignment of the electron beam in the desired direction to the target anode. In case of conical aperture openings, the diameters refer to the smallest respective diameters. The emission surface typically encloses at least a quadratic area of edge length EDL of 0.5 mm or more, often 1.0 mm or more, and typically with EDL≥1.2*DIA1, often EDL≥1.5*DIA1.

In yet another embodiment of the X-ray tube, the following applies for a third distance DIST3 of the beam shaping electrode from the focusing electrode and a second distance DIST2 of the focusing electrode from the control electrode: DIST3≥4*DIST2; preferably DIST3≥8*DIST2; in particular, wherein 3 mm≤DIST3≤50 mm; and/or the following applies for a largest diameter of the third aperture opening of the beam shaping electrode, called third diameter DIA3 in the following, and a second diameter DIA2 of the second aperture of the focusing electrode: DIA3≥6*DIA2; preferably DIA3≥12*DIA2; in particular, wherein 6 mm≤DIA3≤25 mm. These dimensions allow an efficient electron beam shaping with the beam shaping electrode. The comparatively large distance between the focusing electrode and the beam shaping electrode and the comparably large third diameter allow a large widening of the electron beam at the beam shaping electrode even with a small divergence angle of the electron beam, without clipping the electron beam. This results in greater flexibility in the choice of potentials at the focusing electrode (and the beam shaping electrode).

A further embodiment of the X-ray tube is characterized in that the X-ray tube encloses an evacuated interior space, in which the thermionic cathode, the target anode, the control electrode, the focusing electrode and the beam shaping electrode are located. The vacuum allows the electrons to be advantageously accelerated to very high velocities between the cathode and the target anode. The lower the pressure in the X-ray tube, the fewer interfering interactions take place between the electrons and gas particles in the X-ray tube.

A preferred embodiment of the X-ray tube is characterized in that the target anode comprises a diamond heat spreader. A diamond heat spreader can provide a high mechanical stability and a high thermal conductivity. Therefore, a diamond heat spreader provides a high cooling efficiency of the target anode in a robust way. The target anode can be exposed to an electron beam with a comparatively high energy.

A variant of the aforementioned embodiment is characterized in that the diamond heat spreader is composed of isotopically enriched 12C with a purity>99.5% or isotopically enriched 13C with a purity>99.5%. Due to the very high degree of purity of the diamond, such a heat spreader is characterized by a particularly high thermal conductivity. This results in a very high cooling efficiency of the target anode. The percentages above refer to mass.

A preferred variant of the X-ray tube is characterized in that the emission cathode is a dispenser cathode, in particular, with the dispenser cathode comprising a powder compact containing a matrix of tungsten grains embedding BaO, CaO and Al2O3, and, in particular, with the dispenser cathode comprising an indirect heating.

Dispenser cathodes made of these materials typically have surfaces with a low work function for the emission of electrons. Thus, the dispenser cathodes can operate at a lower temperature than other cathodes used in X-ray tubes such as tungsten (W) filaments. This results in a comparatively long lifetime of the dispenser cathodes. An indirect heating of the powder compact, which avoids current flow through the powder compact itself, also contributes to the increased service life. Typically, the dispenser cathode is operated at a temperature of less than 1200° C., often at about 1000° C. It is possible to keep the cathode temperature above the emission limit without regulation (e.g., of a heating current), which simplifies the use of the cathode. By operating the cathode at a constant temperature, undesirable intensity fluctuations of the focal spot are avoided.

The present invention further relates to a method for operating an aforementioned X-ray tube which is characterized in that a cathode potential PC is applied to the emission cathode, a first potential P1 is applied to the control electrode, a second potential P2 is applied to the focusing electrode, a third potential P3 is applied to the beam shaping electrode, and an anode potential PA is applied to the target anode, such that an electron beam is generated at the emission cathode and propagates to the target anode, and X-rays are emitted from the target anode in the region of a beam spot of the electron beam on the target anode, wherein P1−PC>0, further P2>PC, and further PA−PC>+5 kV; in particular, wherein P1−PC:=PDC1, with +10V≤PDC1≤+200V; and, in particular, wherein P2−PC:=PDC2, with +100V≤PDC2≤+800V.

By applying a potential to the control electrode that is positive with respect to the potential at the cathode, electrons emitted from the cathode are accelerated toward the control electrode. Advantageously, the number of electrons accelerated toward the control electrode is mainly dependent on the potential at the control electrode, and also somewhat dependent on the potential at the focusing electrode. As a result, the current density of the electron beam is largely determined by the potentials at these electrodes, and above all by the potential at the control electrode. The potential difference between the cathode and the target anode has a comparatively small influence on the current density of the electron beam. Thereby, the current density of the electron beam can be flexibly adjusted by the potentials at the control electrode and the focusing electrode without having to adjust other parameters that influence the X-ray radiation generated in the X-ray tube.

The first potential P1 at the control electrode results in an electric field between the cathode and the control electrode of significant strength, which facilitates the emission of electrons from the cathode. By altering the first potential P1, the amount of emitted electrons, and thus the strength of the electron beam can be adjusted. In particular, by a high P1, a high strength of the electron beam can be obtained.

The equipotential surfaces of the electric field lines between the cathode and the control electrode form an electrostatic lens, which may already widen the electron beam on its way to the control electrode. Advantageously, this lens can be flexibly changed by changing the voltage at the cathode or the control electrode. This further influences the number of electrons that pass through the control electrode and form the electron beam.

With a potential difference applied between the control electrode and the focusing electrode, equipotential surfaces between the control electrode and the focusing electrode form another electrostatic lens, typically wherein the electrons are accelerated towards the focusing electrode. The electrostatic lens is rotationally symmetric about the beam axis of the electron beam and may have a domed part, typically pointing towards the focusing electrode. This electrostatic lens can efficiently control the divergence of the electron beam, in particular, by widening the electron beam in the direction of the focusing electrode. Advantageously, the shape of the lens or its equipotential surfaces between the control electrode and the focusing electrode and thus the widening of the electron beam can be flexibly adjusted by changing the potential at the control electrode and/or the focusing electrode, thereby changing the shape (divergence) of the electron beam. Typically, beam forming (in particular, setting the divergence)—and thus focusing of the electron beam—is achieved above all by setting the second potential P2.

In addition, the electrostatic lens between the cathode and the control electrode and the electrostatic lens between the control electrode and the focusing electrode are usually hardly affected by the voltage between the cathode and the target anode. This facilitates the control of the electron beam at the control electrode and the focusing electrode.

With the beam shaping electrode, the shape and size of the focal spot can be brought into a desired form, such as a line focus (or elongated ellipsoid, respectively). For this purpose, with appropriate potential differences between the focusing electrode and the beam shaping electrode on the one hand, and between the beam shaping electrode and the target anode on the other hand, further electrostatic lenses may be configured.

In summary, by applying suitable potentials to the cathode, the target anode, the control electrode, the focusing electrode, and the beam shaping electrode, electrostatic lenses can be formed to shape and focus the electron beam on the target anode. Advantageously, the lenses can be changed with high accuracy by varying the aforementioned potentials to adjust the shape and current density of the electron beam and the focal spot on the target anode.

In an advantageous embodiment of the method the emission cathode is grounded with PC at or near zero, and PA is at a high positive potential with respect to ground. The high potential difference causes a high acceleration of the electrons towards the target anode to produce a high energy X-ray radiation at the target anode. The cathode is exposed only to moderate and preferably constant voltages and heating currents which increases the lifetime of the cathode. The heating current brings the emission cathode or a part of it a little away from exact ground potential, typically not more than 10 Volts. Applying a heating current or assessment of the heating voltage and the heating current is particularly simple at a grounded cathode.

An alternative embodiment of the method is characterized in that the target anode is grounded with PA at zero, and that PC is at a high negative potential with respect to ground. In this embodiment, cooling of the target anode is facilitated because risks for cooling systems associated with high voltages of the target anode are avoided. This applies, for example, to cooling systems in which water is used that can carry unwanted electrical currents.

A preferred embodiment of the method is characterized in that P2−P1>0; in particular, wherein P2−P1:=PD12, with +100V≤PD12≤+600V. Due to the higher potential at the focusing electrode compared to the control electrode, the electrons are accelerated from the control electrode towards the focusing electrode and thus towards the target anode. This allows widening of the electron beam towards the focusing electrode. At the indicated preferred voltage differences, efficient focusing of the electron beam can be achieved.

A further embodiment of the method is characterized in that PC=P3. The cathode and the beam shaping electrode are at the same potential. With a potential of the target anode that is positive with respect to the potential of the cathode and therefore positive with respect to the potential of the beam shaping electrode, electric field lines between the focusing electrode, the beam shaping electrode and the target anode are generated, wherein first the electron beam between the focusing electrode and the beam shaping electrode keeps on widening in beam diameter, but beam divergence is reduced. Then, the field lines narrow the electron beam between the beam shaping electrode and the target anode in the direction of the target anode. Advantageously, the electron beam can be focused on the target anode with this comparatively simple choice of the potentials.

An advantageous embodiment of the method is characterized in that P3−P2<0; in particular, wherein P3−P2:=PD23, with −100V≥PD23≥−800V. The electron beam typically keeps on widening in beam diameter between the focusing electrode and the beam shaping electrode, but the beam divergence becomes smaller towards the beam shaping electrode. In particular, the electron beam usually has its maximum cross-section near or at the beam shaping electrode before it is focused onto the target anode and generates the focal spot on the target anode. Advantageously, in the indicated preferred range of voltages, the electron beam has a maximum cross-section which allows sharp focusing of the electron beam on the target anode with comparatively little curvature of the trajectories of the electrons in the electron beam between the beam shaping electrode and the target anode (if the typical distances between the beam shaping electrode and the target anode are taken into account). This avoids sharp changes in the direction of flight of the electrons, facilitating the control of the trajectories of the electrons and the focusing of the electron beam. At the same time, efficient shaping of the focal spot can be achieved in the preferred range of voltages.

Preferably, the method includes an intensity adjustment of the X-ray tube in order to vary the number of electrons in the electron beam, and the intensity adjustment includes changing of the potential PC and/or P1 and/or P2, wherein at least at the beginning of the intensity adjustment and at the end of the intensity adjustment there holds PDC1=Poly(PDC2), where Poly(PDC2) is a polynomial of second order of PDC2, such that at least at the beginning of the intensity adjustment and at the end of the intensity adjustment, the size of the focal spot of the electron beam on the target anode is the same. Often, there holds $PDC1=const\times(PDC2)^2$ at least at the beginning of the intensity adjustment and at the end of the intensity adjustment, wherein const is a proportionality constant, in good approximation. Advantageously, in this embodiment, the electron beam has the same shape and size at the beginning of the adjustment process and at the end of the adjustment process, but the electron density in the electron beam is different. This allows the intensity of the X-ray radiation to be changed in a controlled manner while maintaining the same size of the focal spot, for example to improve the quality of an X-ray image in a controlled manner.

An improvement of the aforementioned embodiment of the invention is characterized in that there holds PDC1=Poly (PDC2) during the entire intensity adjustment, such that the size of a focal spot of the electron beam on the target anode is kept unchanged during the entire intensity adjustment, in particular, wherein during the intensity adjustment, PC is kept constant and P1 and P2 are changed concurrently. Advantageously, the entire beam path including the shape and size of the electron beam remains unchanged during the entire adjustment process, while the electron density in the electron beam is continuously changed. As a result, the intensity of the X-rays is also continuously changed with an unchanged size and shape of the focal spot, facilitating a specific adjustment of the intensity. Typically, a dedicated common adjustment control for this concurrent change of P1 and P2 is provided.

A preferred embodiment of the method is characterized in that the method includes a focus adjustment, that the focus adjustment includes varying the second potential P2 at the focusing electrode until a desired spot size of the beam spot of the electron beam at the target anode is achieved, where the desired spot size is between the minimum spot size and 2× the minimum spot size. Advantageously, focal spots of a size in this range can be used to produce X-ray images with particularly high image resolution due to the good focusing of the electron beams. Via adjusting second potential P2, the focusing can be set particularly easily.

Further advantages of the invention can be seen from the description and the drawing. Likewise, the above-mentioned and the still further elaborated features can each be used individually or in any combination. The embodiments shown and described are not to be understood as a conclusive list, but rather have an exemplary character for the description of the invention.

DETAILED DESCRIPTION OF EMBODIMENTS OF THE INVENTION

Figure 1:
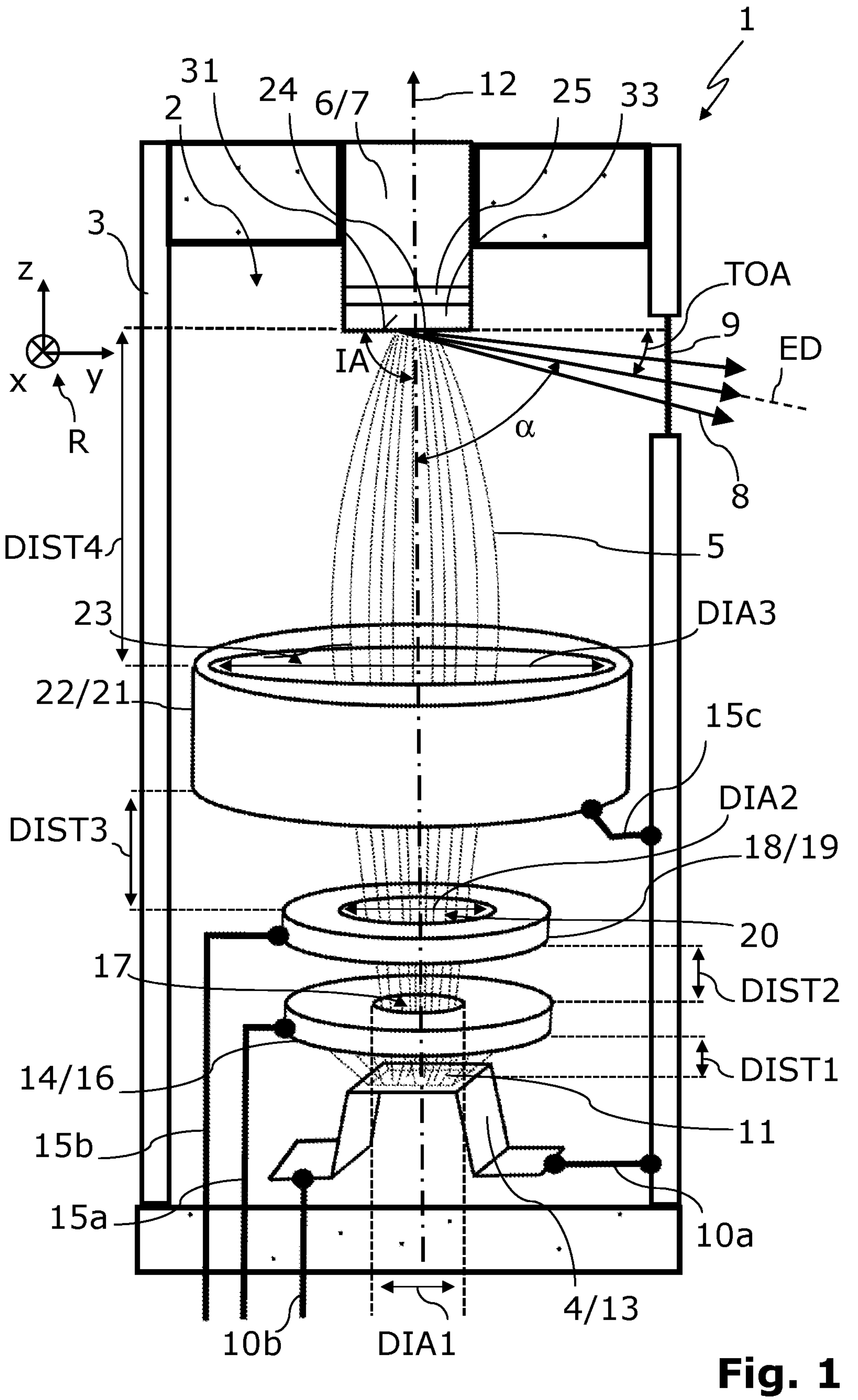
FIG. 1 schematically shows an exemplary first embodiment of an X-ray tube according to the invention.

FIG. 1 schematically shows an exemplary embodiment of an X-ray tube 1 according to the invention in a longitudinal cross-section with an inner space 2, the inner space 2 being evacuated and enclosed by a housing 3. The X-ray tube 1 is provided with a cathode 4 which is used for thermal emission of electrons. In operation of the X-ray tube 1, the electrons, after emission from the cathode 4, flow in the form of an electron beam 5 to a target 6 which is configured as a target anode 7. For this purpose, a positive electrical potential is applied to the target anode 7 with respect to the cathode 4.

The electrons in the electron beam 5 produce X-rays 8 when they hit the target anode 7. At least some of the X-rays 8 exit the X-ray tube 1 through a beryllium window 9 in the housing 3.

The cathode 4 and the target anode 7 are arranged in the inner space 2 of the X-ray tube 1. The propagation direction of the electron beam 5 is along the direction of a z-axis of a reference system R in the form of a Cartesian coordinate system with an x-axis, a y-axis and the z-axis, compare electron beam axis 12. The x-axis of the reference system R is symbolized by a cross; it is directed perpendicular to the plane of drawing. Note that for better understanding, part of the X-ray tube 1 is shown with a little tilt, deviating from the longitudinal cross-section (see also below).

The cathode 4 is connected to an external electrical power source (not shown) via two electrical conductors 10*a*, 10*b* so that a heating current can flow through the cathode 4 to heat the cathode 4 and thereby cause an emission of electrons from the cathode 4. The cathode 4 is at potential PC, which is ground potential here. The cathode 4 has a flat surface 11 from which the electrons can be thermally emitted, such that the density distribution of the emitted electrons is highly homogeneous. The highly homogeneous density distribution of the emitted electrons contributes to a density distribution of electrons in the electron beam 5 that is highly homogeneous in the xy-plane, too. Furthermore, the cathode 4 is formed as a dispenser cathode 13, which allows the cathode 4 to be operated at a lower operating temperature and with a longer lifetime.

A control electrode 14 is arranged next to the cathode 4 in the direction of the z-axis at a distance DIST1 in order to enhance electron emission from the cathode 4 and to accelerate the electrons towards the target anode 7. During operation of the X-ray tube 1, a positive potential P1 is applied to the control electrode 14 with respect to the cathode 4 by a control connection 15*a*; i.e., the potential difference PDC1 between the potential P1 at the control electrode and the potential PC at the cathode is positive. In the embodiment shown in FIG. 1, the potential P1 at the control electrode can be P1=50V and the distance DIST1 can be DIST1=250 μm. The potential P1 of the control electrode 14 accelerates electrons from the cathode 4 towards the control electrode 14. The control electrode 14 is formed as an aperture 16 with a first aperture opening 17, wherein the first aperture opening 17 has a first diameter DIA1 and is smaller than the emission surface 11 of the cathode. Therefore, a considerable part P of the emitted electrons are blocked at the first aperture 17, here about P=50%. The size and shape (in particular, the edges) of the cathode 4 do not affect the electron beam or its homogeneity of intensity distribution. In the embodiment shown in FIG. 1, the first diameter DIA1 can be DIA1=0.6 mm. The first aperture opening 17 has rotational symmetry around the beam axis 12 of the electron beam 5. This causes a symmetrical distribution of electrons passing through the first aperture opening 17 with respect to the beam axis 12 of the electron beam 5. Via adjusting the first potential P1, the number of electrons in the electron beam 5 can be adjusted.

To focus the electron beam 5 in the direction of the target anode 7, a focusing electrode 18 is arranged next to the control electrode 14 in the z-direction at a distance DIST2. The focusing electrode 18 is designed as an aperture 19 with a second aperture opening 20 which, like the first aperture opening 17, has a rotational symmetry about the beam axis 12 of the electron beam 5. During operation of the X-ray tube 1, a potential P2 is applied to the focusing electrode 18 which is positive with respect to the potential P1 of the control electrode 14 (i.e., P2>P1) which further accelerates the electrons in the electron beam 5 in the direction of the target anode 7. The potential is applied to the focusing electrode 18 by a focusing connection 15*b*. In the embodiment shown in FIG. 1, the potential P2 at the focusing electrode 18 can be P2=200V and the distance DIST2 can be DIST2=600 μm. Through its potential P2, the focusing electrode 18 also has some influence on the number of electrons extracted from the cathode 4. However, this influence is typically less than the influence of the potential P1 of the control electrode 14, which is located closer to the cathode 4.

The electron beam 5 is widened on its way from the control electrode 14 to the focusing electrode 18, wherein the electron beam 5 has a cross-section that is rotationally symmetrical around the beam axis. To avoid a reduction in the number of electrons in the electron beam 5 as it passes through the second aperture opening 20, a diameter DIA2 of the second aperture opening 20 is larger than the diameter DIA1 of the first aperture opening 17. In the embodiment shown in FIG. 1, the diameter DIA2 can be DIA2=2 mm. During operation of the X-ray tube 1, the electrons that have passed through the first aperture opening 17 can pass through the second aperture opening 20, without or only an insignificant amount of electrons being removed from the electron beam 5 by the focusing electrode 18, even if the electron beam 5 between the control electrode 14 and the focusing electrode 18 has a relatively large divergence.

A beam shaping electrode 21 is arranged next to the focusing electrode 18 in the z-direction at a distance DIST3. The beam shaping electrode 21 is designed as an aperture 22 with a third aperture opening 23, the third aperture opening 23 having an elliptical shape and extending in the xy-plane perpendicular to the beam axis 12. With its longest extension, the third aperture opening 23 extends in the direction of the y-axis of the reference system R. In other words, the y-axis of the reference system R is parallel to the major axis of the third aperture opening 23. In particular, the longest extension of the third aperture opening 23 is referred to as the third diameter DIA3. In the embodiment shown in FIG. 1, the distance DIST3 can be DIST3=2 cm and the third diameter DIA3 can be DIA3=20 mm. Perpendicular to its longest extension, the third aperture opening 23 extends in the direction of the x-axis of the reference system R. During operation of the X-ray tube 1, the beam shaping electrode 21 is at potential P3 which is negative with respect to the potential P2 at the focusing electrode 18. The potential P3 is applied to the beam shaping electrode 21 by a beam shaping connection 15*c*. In the embodiment shown, the beam shaping connection 15*c* and the electrical conductor 10*b* are both connected to the grounded housing 3, and accordingly, the same potential (here ground potential) is applied to the beam shaping electrode 21 as to the cathode 4.

The electron beam 5 still widens between the focusing electrode 18 and the beam shaping electrode 21, but the divergence of the electron beam 5 becomes smaller again towards the target anode 7. The electron beam 5 reaches its maximum width at or near the beam shaping electrode 21.

In operation of the X-ray tube 1, the diameter of the electron beam 5 is sufficiently large that the elliptical shape of the third aperture opening 23 causes the cross-section of the electron beam 5 to be deformed from a cross-section with the aforementioned rotational symmetry into an elliptical cross-section.

The target anode 7 is located next to the beam shaping electrode 21 in the z-direction at a distance DIST4. In the embodiment shown in FIG. 1, the distance DIST4 can be DIST4=5 cm. During operation of the X-ray tube 1, the cross-section of the electron beam 5 is narrowed between the beam shaping electrode 21 and the target anode 7, the potential PA of the target anode 7 being positive with respect to the potentials P1, P2, P3 at the other electrodes (in particular, with respect to the potential at the beam shaping electrode 21). The electron beam 5 is focused on the target anode 7 and forms a focal spot 24 on the target anode 7. In the embodiment shown in FIG. 1, the potential PA at the target anode 7 can be PA=+10 kV.

In order to better dissipate the heat generated when the electrons hit the target anode 7, the target anode 7 has a layer with high thermal conductivity in the form of a diamond heat spreader 25. On the diamond heat spreader 25 there is deposited a target cover layer 33, here of Molybdenum. Electrons from the electron beam 5 impinging on the target anode 7 in the focal spot 24 cause the X-rays 8 to be emitted from the target anode 7 or its target cover layer 33, respectively. In this process, the electron beam 5 retains its elliptical cross-section, which the electron beam 5 has obtained through the beam shaping electrode 21. Therefore, the focal spot 24 on the target anode 7 also has an elliptical cross-section. In the example shown, the target surface 31 of the target anode 7 is perpendicular to the electron beam axis 12, compare the angle of inclination IA of 90° here. A (central) emission direction ED of the X-ray radiation 8 passing through the beryllium window 9 has a take-off angle TOA of about 12° with the target surface 31. Between the electron beam axis 12 and the emission direction ED of the X-rays 8 here results an angle $\alpha$ of about 78°. Seen in the (central) emission direction ED of the X-rays 8, the elliptical focal 24 spot appears as a circular focal spot, resulting in comparatively simple optical properties of the X-rays 8 in this emission direction ED. In addition, the elliptical focal spot 24 causes a lower heat load on the target anode 7 as compared to a circular spot.

Advantageously, the current density of the electron beam 5 (and thus the intensity of the X-rays 8) in the X-ray tube 1 according to the invention is determined by the first potential P1 at the control electrode 14 and the second potential P2 at the focusing electrode 18, but not or only slightly by the difference of the potentials PC and PA at the target anode 7 and the cathode 4.

The cathode 4 and the electrodes 14, 18 and 21 are shown in FIG. 1 slightly inclined with respect to the x-axis of the reference system R to indicate their shape.

Figure 2:
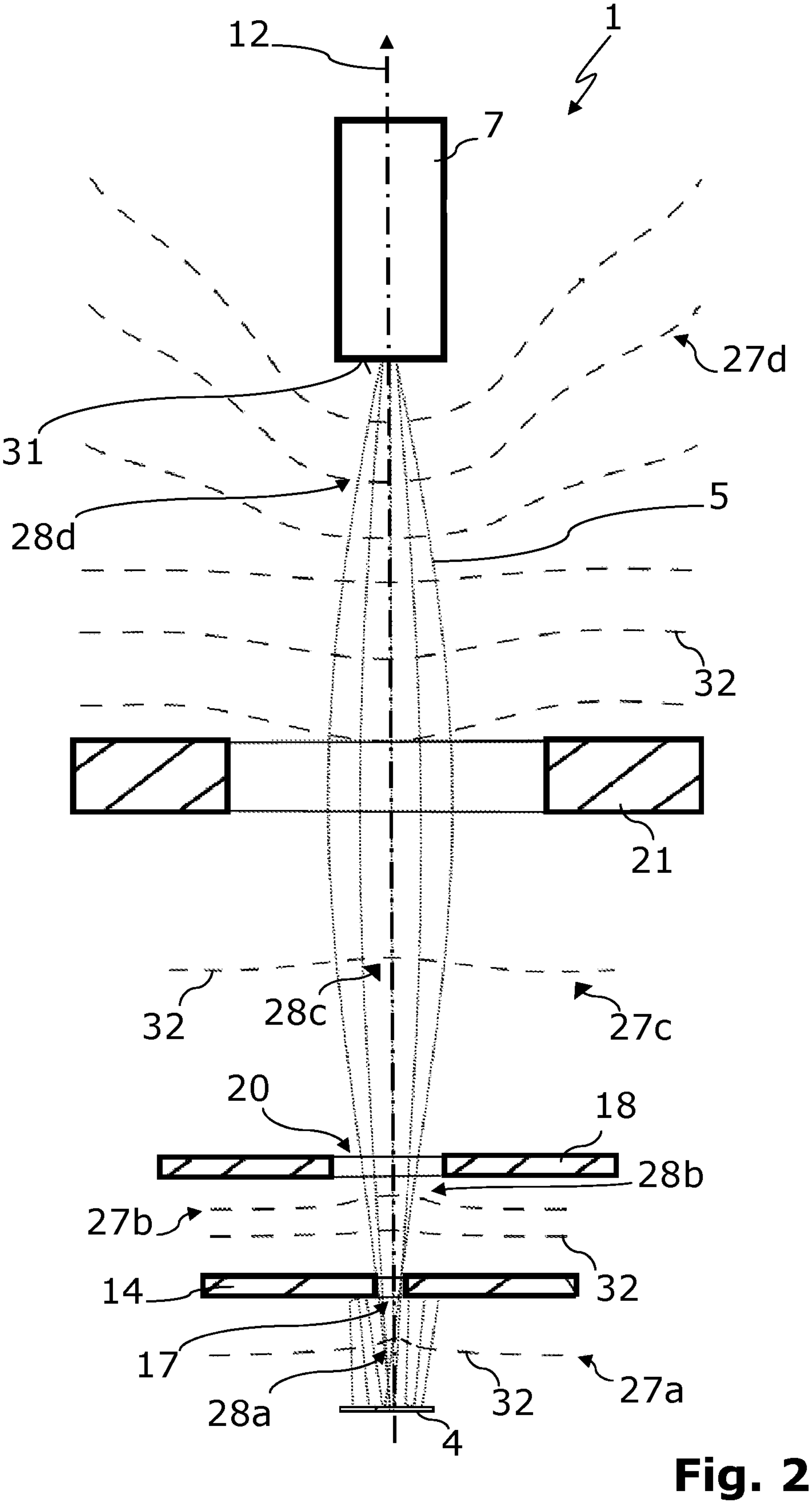
FIG. 2 schematically shows a cross-section through an electrode arrangement of the X-ray tube of FIG. 1.

FIG. 2 schematically shows a cross-section through the electrode arrangement of the X-ray tube 1 of FIG. 1. During operation of the X-ray tube 1, a potential P1 is applied to the control electrode 14 which is positive with respect to the potential PC at the cathode 4. As a result, equipotential surfaces 32 of electric field lines between the cathode 4 and the control electrode 14 form an electrostatic first lens 27*a* between the cathode 4 and the control electrode 14. This first lens 27*a* has a domed part 28*a* pointing in the direction of the control electrode 14. Through the first lens 27*a*, the electron emission at the cathode 4 and the movement of the electrons near the beam axis 12 can easily be controlled, and electrons are accelerated towards the target anode 7. This can be used to influence the number of electrons passing the first aperture opening 17 during operation of the X-ray tube 1. The shape of the first lens 27*a* can be changed precisely and quickly by the potentials P1 and PC at the control electrode 14 and the cathode 4.

During operation of the X-ray tube 1, the potential P2 at the focusing electrode 18 is positive compared to the potential P1 at the control electrode 14. Thus the equipotential surfaces 32 of electric field lines between the focusing electrode 18 and the control electrode 14 form an electrostatic second lens 27*b* between the focusing electrode 18 and the control electrode 14, wherein the electrons are accelerated towards the focusing electrode 18. The second electrostatic lens 27*b* is rotationally symmetric around the beam axis 12 of the electron beam 5 and has a domed part 28*b* pointing towards the focusing electrode 18. In operation of the X-ray tube 1, this causes the electron beam 5 to widen in the direction of the focusing electrode 18. The shape of the second lens 27*b* can be adjusted quickly and accurately by changing the potentials P1 and P2 at the control electrode 14 and the focusing electrode 18.

Further, during operation of the X-ray tube 1 the potential at the beam shaping electrode 21 is negative compared to the potential at the focusing electrode 18 and the potential at the target anode 7, and an electrostatic third lens 27*c* is formed by equipotential surfaces 32 of electric field lines between the focusing electrode 18 and the beam shaping electrode 21. The equipotential lines 32 of the third electrostatic lens 27*c* are shaped by the potentials at the focusing electrode 18, the beam shaping electrode 21 and the anode 7. Typically, however, the electrostatic third lens 27*c* between the beam shaping electrode 21 and the focusing electrode 18 is hardly affected by the potential at the focusing electrode 18, making the control of the electron beam 5 between the focusing electrode 18 and the beam shaping electrode 21 easier. Most of the third lens 27*c* has a domed part 28*c* pointing in the direction of the beam shaping electrode 21. The electron beam 5 is further widened between the focusing electrode 18 and the beam shaping electrode 21, wherein the beam divergence decreases with increasing proximity to the beam shaping electrode 21. The electron beam 5 usually reaches its maximum cross section near or at the beam shaping electrode 21. Advantageously, the shape of the third lens 27*c* between the focusing electrode 18 and the beam shaping electrode 21 can be changed flexibly by changing the potential at the target anode 7 or the beam shaping electrode 21 (or the focusing electrode 18). Thereby, the shape and size of the electron beam 5 and its maximum cross section can be altered if desired.

In operation of the X-ray tube 1, a potential PA is applied to the target anode 7 which is positive compared to the potential P3 at the beam shaping electrode 21. Thus an electrostatic fourth lens 27*d* is formed by equipotential surfaces 32 of electric field lines between the target anode 7 and the beam shaping electrode 21 between the beam shaping electrode 21 and the target anode 7. This lens 27*d* has a domed part 28*d* pointing towards the beam shaping electrode 21, wherein the electrons are accelerated towards the target anode 7. The electron beam 5 is focused on the target surface 31 of the target anode 7 by the fourth lens 27*d*. Because of the non-rotationally symmetric shape of the third aperture opening 23 of the beam shaping electrode 21, the fourth lens 27*d* between the beam shaping electrode 21 and the target anode 7 can act as a stigmator in that this lens 27*d* deforms the cross-section of the electron beam 5 from a rotationally symmetric cross-section to a non-rotationally symmetric cross-section (see also FIG. 3).

Advantageously, the fourth lens 27*d* between the target anode 7 and the beam shaping electrode 21 can be flexibly changed by adjusting the potential at the target anode 7 or the beam shaping electrode 21, if need may be, which affects the focusing of the electron beam 5 on the target anode 7. Furthermore, the electrostatic fourth lens 27*d* between the beam shaping electrode 21 and the target anode 7 is usually hardly affected by the potential at the focusing electrode 18, facilitating the control of the focusing of the electron beam 5 between the target anode 7 and the beam shaping electrode 21. However note that in practice, for changing the focus of the electron beam 5 on the target anode 7, the second potential P2 is adjusted often together with the first potential P1, and P3 and PA are kept constant.

Figure 3:
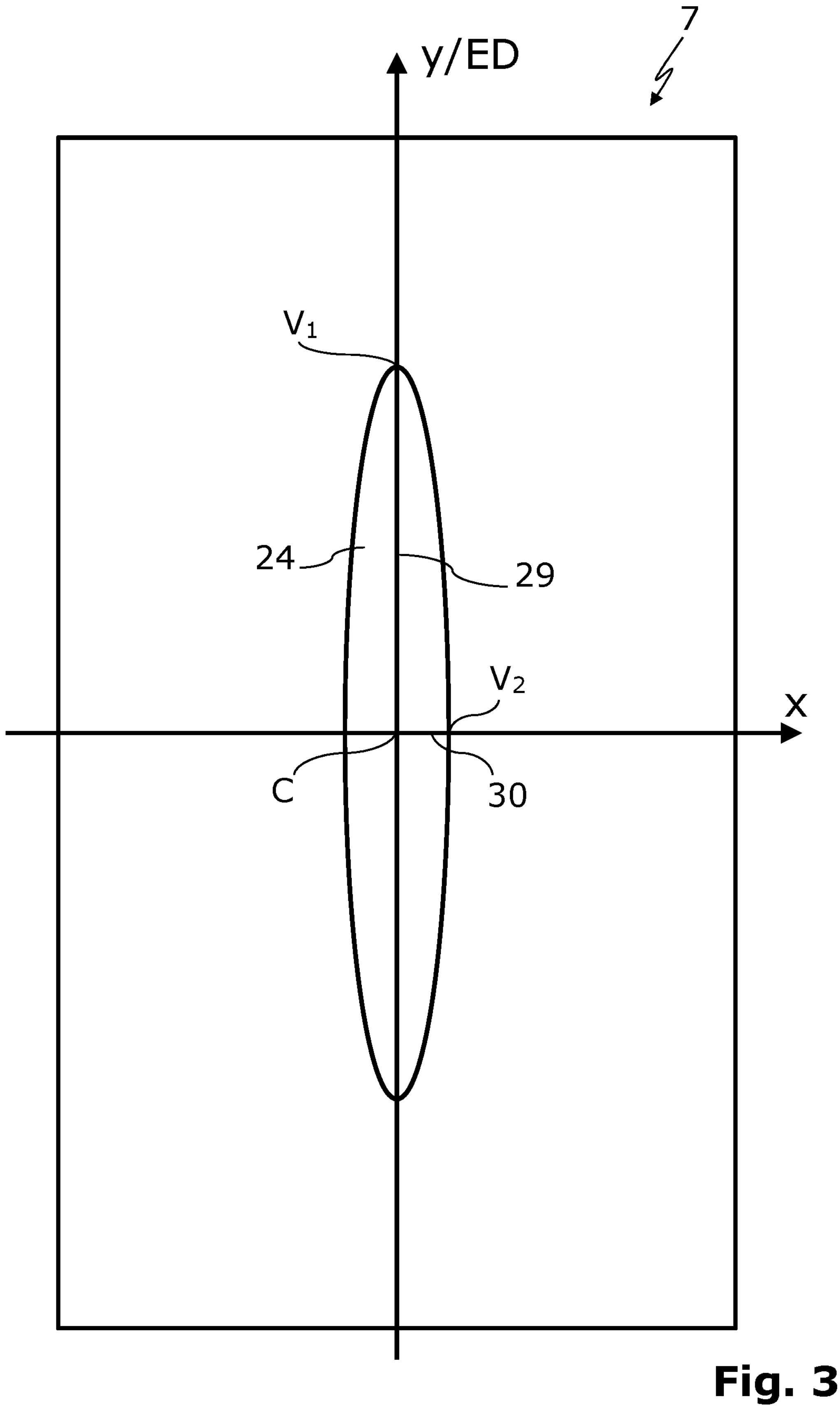
FIG. 3 shows a schematic top view of a target anode of the X-ray tube in operation.

FIG. 3 shows a top view of the target anode 7 during operation of the X-ray tube 1 (see FIG. 1) in a direction perpendicular to the surface of the target anode 7. The electron beam 5 (see FIG. 1) generates the focal spot 24 on the target anode 7, and the focal spot 24 has an elliptical shape due to the elongated shape of the beam shaping electrode 21. The largest longitudinal extension of the focal spot 24 runs in the y-direction. The ratio of the major semi-axis 29 between the center C and the vertex $V_1$ of the ellipse in the y-direction to the minor semi-axis 30 between the center C and the vertex $V_2$ in the x-direction is about 1:7 in the example shown. When seen from emission direction ED (which is inclined somewhat to the plane of drawing in FIG. 3, here about 12°, see TOA in FIG. 1), the focal spot 24 appears basically circular in projection (not shown in FIG. 3).

Figure 4:
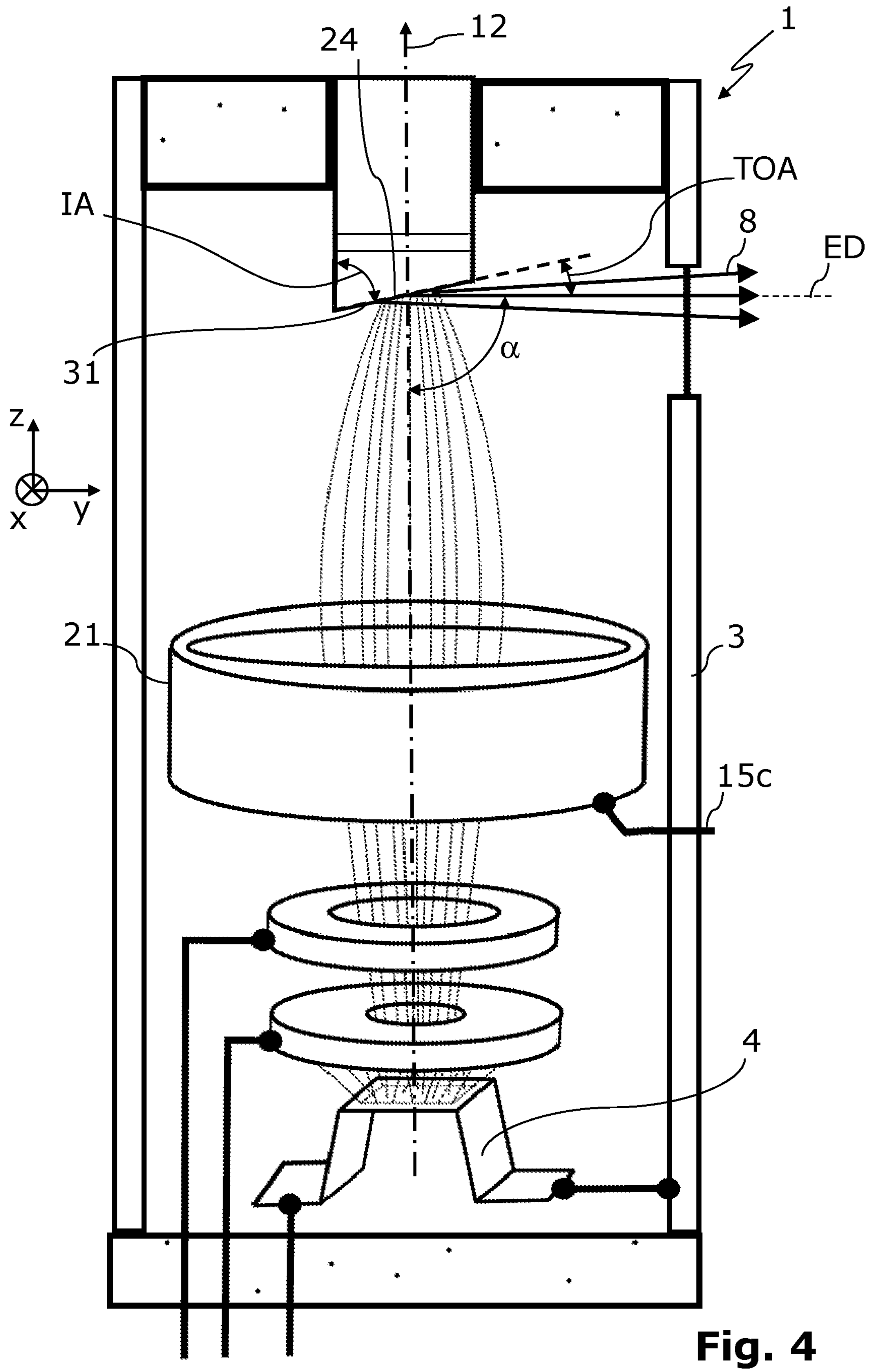
FIG. 4 schematically shows a second embodiment of an X-ray tube according to the invention.

FIG. 4 schematically shows a second embodiment of an X-ray tube 1 according to the invention. The second embodiment of the X-ray tube 1 is similar to the embodiment shown in FIG. 1, so only the major differences are discussed here. In the second embodiment of FIG. 2, the flat target surface 31 is inclined with respect to the z direction or the electron beam axis 12 with an angle of inclination IA of about 78°. In other words, the flat target surface 31 deviates by about 12° from a perpendicular orientation (that would be aligned with the xy-plane) with respect to the y-axis and z-axis. The take-off angle TOA between the plane of the flat target surface 31 and the emission direction ED of the X-rays 8 is again about 12°. The emission direction ED of the X-rays 8 is perpendicular to the z-direction or the electron beam axis 12. The inclination of the target surface 31 with respect to the electron beam axis 12 also contributes to the elliptical shape of the focal spot 24 on the target surface 31 here.

Furthermore, the beam shaping connection 15*c* of the beam shaping electrode 21 is led out of the housing 3 of the X-ray tube 1 to be connected to an external voltage source (not shown). This allows the beam shaping electrode 21 to have a potential P3 that is individually set, in particular, different from the potential PC of the cathode 4.

Figure 5:
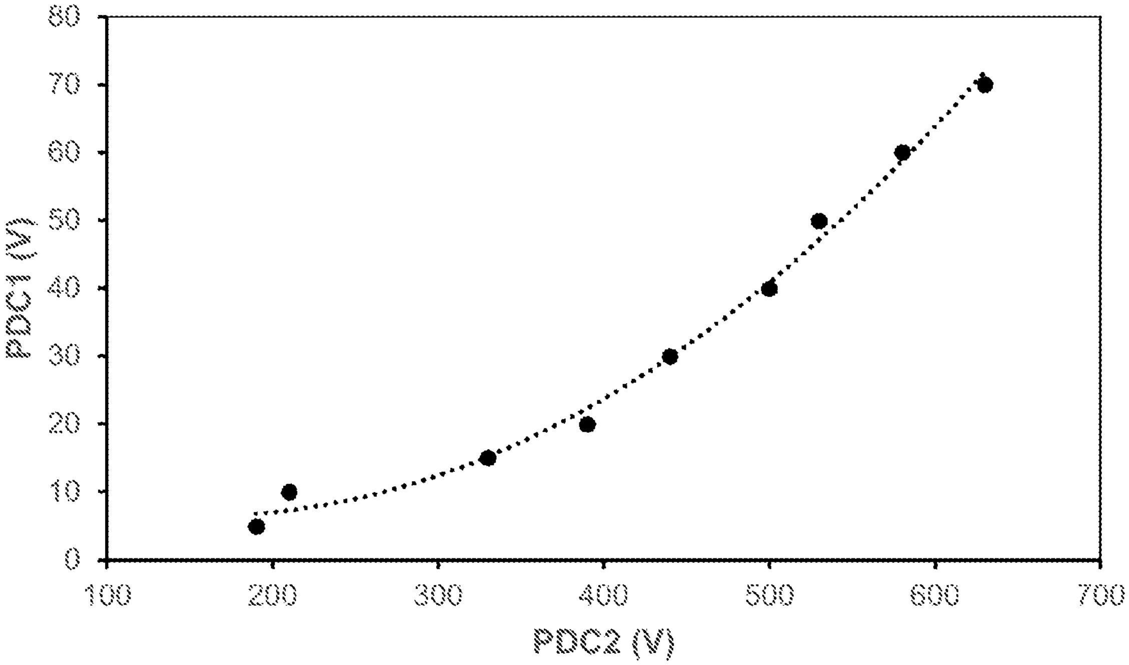
FIG. 5 shows a diagram illustrating the dependence of voltage differences PDC1 and PDC2 of an X-ray tube according to the invention during an adjustment process of the intensity of the X-ray radiation from the X-ray tube in an example.

FIG. 5 shows a diagram illustrating an example of an adjustment process of the intensity of the X-ray radiation 8 from the X-ray tube 1 (see FIG. 1) according to the invention, in which the current density of the electron beam 5 has been changed while the size of the focal spot 24 on the target anode 7 has been kept constant. The first potential P1 was set to different voltage values, and in each case, the second potential P2 was adjusted until the same (minimum size) focal spot was achieved. PC was kept constant (at ground potential). In FIG. 5, the potential difference between the control electrode 14 and the cathode 4 (PDC1=P1−PC) is plotted as a function of the potential difference between the focusing electrode 18 and the cathode 4 (PDC2=P2−PC) for the different setups.

In FIG. 5, the voltage between the control electrode 14 and the cathode 4 (PDC1) is plotted on the ordinate and the voltage between the focusing electrode 18 and the cathode 4 (PDC2) is plotted on the abscissa. The thick black dots show experimental values for the voltage PDC2 and the corresponding voltage PDC1 when PDC2 changes from about 190 volts to about 630 volts. The values for PDC1 change from about 5 volts to about 70 volts during this process. The dashed line shows a calculated dependence of PDC1 on PDC2 under a fitting procedure, where the dependence is modelled by a second order polynomial fit:

$$PDC1=0.0003\times(PDC2)^2-0.0924\times PDC2+13.78.$$

FIG. 5 shows that a sharp focus of the electron beam can be maintained in good approximation when a relationship between PDC1 and PDC2 is kept, with the relationship being modelled by a second order polynomial. So the intensity of the X-ray radiation (resp. the electron beam intensity) can be changed (set) via P1, and when adjusting P2 according to the relationship above concurrently, the focusing and more specifically the size of the focal spot does not change. This substantially simplifies the operation of the tube.

Figure 6:
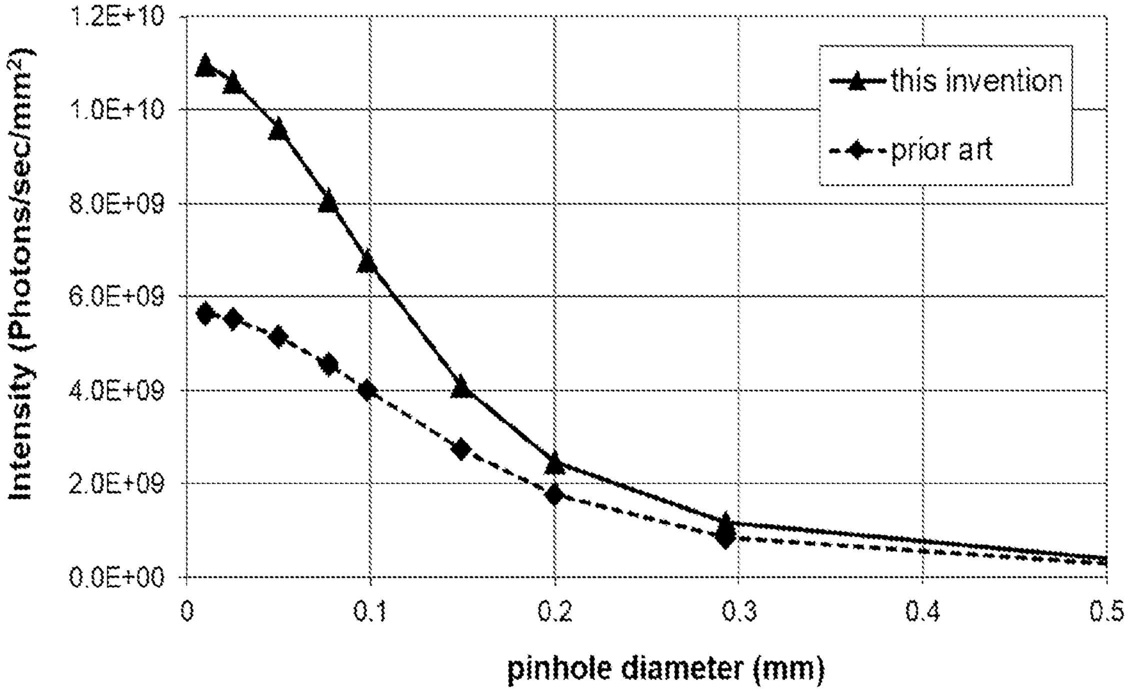
FIG. 6 shows a diagram illustrating the intensity of X-ray radiation emitted from an X-ray tube according to the invention compared to an intensity of X-ray radiation emitted from a conventional X-ray tube in an example.

FIG. 6 concerns the intensity of an X-ray radiation 8 emerging from an X-ray tube 1 (see FIG. 1) according to the invention compared to an intensity of an X-ray radiation emerging from a conventional X-ray tube equipped with a wound tungsten filament as a cathode. The anodes in both X-ray tubes 1 comprise molybdenum as a target cover layer, and the anodes in both X-ray tubes 1 are arranged on a diamond heat spreader 25.

In the experimental setup, the X-rays 8 from the respective X-ray tube are reflected at a Montel mirror, pass through a pinhole positioned at the image focus of the Montel mirror, and then hit a photodiode. Pinholes with different diameters are used for the measurement. The photon flux in the X-ray radiation 8 can be determined from the current of the photodiode. Then, using the diameter of the respective pinhole, the intensity of the X-ray radiation hitting the photodiode can be determined. Both tubes were operated at conditions where the maximum intensity could be obtained without significant degradation over time (on the order of 6 months or more).

In FIG. 6, the intensity of the X-ray radiation 8 from the respective X-ray tube 1 (measured in number of photons per second and per $mm^2$) is plotted on the ordinate and the diameter of the respective pinhole (measured in mm) is plotted on the abscissa. The intensity of the X-ray radiation 8 from the X-ray tube 1 according to the invention is indicated with a solid line, with the measured values shown as triangles. The intensity of the X-ray radiation from the X-ray tube according to the prior art is indicated with a dashed line, with the measured values shown as diamonds. For both X-ray tubes, the intensity curves resemble 2D Gaussian functions, indicating that the tube focal spot is of 2D Gaussian type. The maximum values of the intensity can be determined from very small diameters of the pinholes close to zero.

As illustrated in FIG. 6, the maximum intensity of the X-ray radiation 8 emerging from the X-ray tube 1 according to the invention is about a factor of 2 higher than the maximum intensity of the X-ray radiation emerging from the conventional X-ray tube. The intensity of the X-ray radiation of the conventional X-ray tube is limited, in particular, by the thermal load capacity of the tungsten filament. In contrast, in the X-ray tube 1 according to the invention, the current density of the electron beam and thus the intensity of the emitted X-ray radiation 8 can be controlled to a large extent by the control electrode 14 and the focusing electrode 18 (see FIG. 1). Further, the flat cathode with high homogeneity of electron emission results in less burden to the target anode. As a result, a higher intensity of the emitted X-ray radiation 8 can be effected in X-ray tubes according to the invention than in the conventional X-ray tubes with tungsten filaments.

LIST OF REFERENCE SIGNS

1 X-ray tube
2 inner space
3 housing
4 cathode
5 electron beam
6 target
7 target anode
8 X-rays
9 beryllium window

10*a,b* electrical conductors
11 flat emission surface
12 beam axis
13 dispenser cathode
14 control electrode
15*a-c* control connections
16 aperture (control electrode)
17 first aperture opening
18 focusing electrode
19 aperture (focusing electrode)
20 second aperture opening
21 beam shaping electrode
22 aperture (beam shaping electrode)
23 third aperture opening
24 focal spot
25 diamond heat spreader
27*a-d* electrostatic lenses
28*a-d* domed parts of lenses
29 major semi axis
30 minor semi axis
31 target surface
32 equipotential lines
33 target cover layer
R reference system
ED emission direction of X-rays
IA angle of inclination
TOA take-off angle
α angle of emission direction of X-rays versus electron beam axis

What is claimed is:

1. An x-ray tube, comprising:
a thermionic cathode having a flat electron emission surface;
a plurality of electrostatic electrodes; and
a target;
wherein the x-ray tube is designed for generating an electron beam propagating from the cathode to the target along a beam axis running along a z direction and for generating a microfocus spot on the target;
wherein the target is configured as a target anode;
and wherein the x-ray tube comprises:
a control electrode, located in z direction in front of the flat electron emission surface, and configured as an aperture with a first aperture opening smaller than the emission surface, the first aperture opening having a contour which is rotationally symmetric with respect to the beam axis;
a focusing electrode, located in z direction in front of the control electrode, and configured as an aperture with a second aperture opening larger than the first aperture opening, the second aperture opening having a contour which is rotationally symmetric with respect to the beam axis;
a beam shaping electrode, located in z direction in front of the focusing electrode and before the target anode, and configured as an aperture with a third aperture opening, the third aperture opening having a contour which is aligned with an xy plane and non-rotationally symmetric with respect to the beam axis;
wherein the thermionic cathode and the beam shaping electrode are electrically connected;
with x, y, z forming a Cartesian coordinate system.

2. The x-ray tube according to claim 1, wherein the third aperture opening is of an elliptical shape, and the third aperture opening has a major axis aligned with the y direction.

3. The x-ray tube according to claim 2, wherein the target anode has a flat target surface, and the flat target surface is inclined with respect to the y direction, inclined with respect to the z direction, and is parallel to the x direction.

4. The x-ray tube according to claim 2, wherein the beam shaping electrode is adapted to shape the electron beam into a line focus on the target anode with an aspect ratio in x: y smaller than 1:5.

5. An x-ray tube according to claim 1, wherein the x-ray tube comprises a control connection configured for independently applying a control voltage to the control electrode, and a focusing connection configured for independently applying a focusing voltage to the focusing electrode.

6. The x-ray tube according to claim 1, wherein the thermionic cathode and the beam shaping electrode are grounded.

7. The x-ray tube according to claim 1, wherein the x-ray tube comprises a beam shaping connection for independently applying a beam shaping voltage to the beam shaping electrode.

8. The x-ray tube according to claim 1, wherein the control electrode is adapted to mask a portion P of the electron beam originating from the thermionic cathode, with $P \geq 50\%$.

9. The x-ray tube according to claim 1, wherein for a first distance DIST1 of the control electrode from the emission surface and a second distance DIST2 of the focusing electrode from the control electrode, the following applies: $DIST2 \geq 1.5 * DIST1$, wherein $100\ \mu m \leq DIST1 \leq 400\ \mu m$ and/or $200\ \mu m \leq DIST2 \leq 1000\ \mu m$.

10. The x-ray tube according to claim 1, wherein for a first diameter DIA1 of the first aperture opening of the control electrode and a second diameter DIA2 of the second aperture opening of the focusing electrode, the following applies: $DIA2 \geq 3 * DIA1$, wherein $0.2\ mm \leq DIA1 \leq 1.0\ mm$ and/or $0.6\ mm \leq DIA2 \leq 3.0\ mm$.

11. The x-ray tube according to claim 1, wherein for a third distance DIST3 of the beam shaping electrode from the focusing electrode and a second distance DIST2 of the focusing electrode from the control electrode, the following applies:
$DIST3 \geq 4 * DIST2$; and/or,
wherein for a largest diameter of the third aperture opening of the beam shaping electrode, called third diameter DIA3 in the following, and a second diameter DIA2 of the second aperture opening of the focusing electrode, the following applies: $DIA3 \geq 6 * DIA2$.

12. The x-ray tube according to claim 11, wherein $3\ mm \leq DIST3 \leq 50\ mm$, and/or, $6\ mm \leq DIA3 \leq 25\ mm$.

13. The x-ray tube according to claim 1, wherein the x-ray tube encloses an evacuated interior space, in which the thermionic cathode, the target anode, the control electrode, the focusing electrode and the beam shaping electrode are located.

14. The x-ray tube according to claim 1, wherein the target anode comprises a diamond heat spreader.

15. The x-ray tube according to claim 14, wherein the diamond heat spreader is composed of isotopically enriched 12C with a purity>99.5% or isotopically enriched 13C with a purity>99.5%.

16. The x-ray tube according to claim 1, wherein the thermionic cathode is a dispenser cathode, with the dispenser cathode comprising a powder compact containing a matrix of tungsten grains embedding BaO, CaO and $Al_2O_3$, and the dispenser cathode comprising an indirect heating.

17. A method for operating the x-ray tube according to claim 1, wherein a cathode potential PC is applied to the thermionic cathode, a first potential P1 is applied to the control electrode, a second potential P2 is applied to the focusing electrode, a third potential P3 is applied to the beam shaping electrode, and an anode potential PA is applied to the target anode, wherein an electron beam is generated at the thermionic cathode and propagates to the target anode, and x-rays are emitted from the target anode in the region of a beam spot of the electron beam on the target anode, wherein $P1-PC>0$, $P2>PC$, and $PA-PC>+5$ kV, wherein $P1-PC:=PDC1$, with $+10V \leq PDC1 \leq \pm 200V$, and wherein $P2-PC:=PDC2$, with $+100V \leq PDC2 \leq +800V$.

18. The method according to claim 17, wherein the thermionic cathode is grounded with PC at or near zero, and wherein PA is at a high positive potential with respect to ground.

19. The method according to claim 17, wherein the target anode is grounded with PA at zero, and wherein PC is at a high negative potential with respect to ground.

20. The method according to claim 17, wherein $P2-P1>0$, wherein $P2-P1:=PD12$, with $+100V \leq PD12 \leq \pm 600V$.

21. The method according to claim 17, wherein PC=P3.

22. The method according to claim 17, wherein $P3-P2<0$, and wherein $P3-P2:=PD23$, with $-100V \geq PD23 \geq -800V$.

23. The method according to claim 17, wherein the method includes an intensity adjustment of the x-ray tube in order to vary the number of electrons in the electron beam, wherein the intensity adjustment includes changing of the potential PC and/or P1 and/or P2, wherein at least at the beginning of the intensity adjustment and at the end of the intensity adjustment there holds PDC1=Poly(PDC2), where Poly(PDC2) is a polynomial of second order of PDC2, wherein at least at the beginning of the intensity adjustment and at the end of the intensity adjustment, the size of the beam spot of the electron beam on the target anode is the same.

24. The method according to claim 23, wherein there holds PDC1=Poly(PDC2), during the entire intensity adjustment, wherein the size of the beam spot of the electron beam on the target anode is kept unchanged during the entire intensity adjustment, wherein during the intensity adjustment, PC is kept constant and P1 and P2 are changed concurrently.

25. The method according to claim 17, wherein the method includes a focus adjustment, wherein the focus adjustment includes varying the second potential P2 at the focusing electrode until a desired spot size of the beam spot of the electron beam at the target anode is achieved, where the desired spot size is between a minimum spot size and 2× the minimum spot size.

26. The x-ray tube according to claim 1, wherein the flat electron emission surface of the thermionic cathode is rectangular in shape and the first aperture opening is circular in shape.

27. The x-ray tube according to claim 1, wherein the control electrode with its first aperture opening blocks at least 50% of the emitted electrons from the flat electron emission surface of the thermionic cathode.

* * * * *